U S009577974B1

(12) United States Patent
Harb

(10) Patent No.: US 9,577,974 B1
(45) Date of Patent: Feb. 21, 2017

(54) METHODS, DEVICES, AND MEDIUMS ASSOCIATED WITH MANIPULATING SOCIAL DATA FROM STREAMING SERVICES

(75) Inventor: Reda Harb, Bellevue, WA (US)

(73) Assignee: INTELLECTUAL VENTURES FUND 79 LLC, Las Vegas, NV (US)

( * ) Notice: Subject to any disclaimer, the term of this patent is extended or adjusted under 35 U.S.C. 154(b) by 593 days.

(21) Appl. No.: 13/396,361

(22) Filed: Feb. 14, 2012

(51) Int. Cl.
*H04L 12/58* (2006.01)
*G06F 3/048* (2013.01)

(52) U.S. Cl.
CPC ............. *H04L 51/32* (2013.01); *H04L 51/10* (2013.01)

(58) Field of Classification Search
CPC ..... G06Q 10/107; H04L 12/585; H04L 12/58; H04L 12/581; H04L 12/5855; H04L 29/08072; H04L 29/06; H04L 12/584; H04L 51/08; G06F 3/048
USPC ................................. 709/204, 206, 217–219
See application file for complete search history.

(56) References Cited

U.S. PATENT DOCUMENTS

| 6,529,600 | B1 * | 3/2003 | Epstein et al. ................ 380/252 |
| 6,546,556 | B1 * | 4/2003 | Kataoka et al. ................ 725/35 |
| 6,671,356 | B2 * | 12/2003 | Lewis ..................... H04L 12/58 348/E7.081 |
| 2002/0056123 | A1 * | 5/2002 | Liwerant et al. ............... 725/87 |
| 2007/0103558 | A1 * | 5/2007 | Cai et al. ................. 348/211.11 |
| 2009/0234965 | A1 * | 9/2009 | Viveganandhan et al. ... 709/231 |
| 2010/0011295 | A1 * | 1/2010 | O'Connor et al. ........... 715/719 |
| 2010/0111360 | A1 * | 5/2010 | Sigal ............................. 382/103 |
| 2010/0174709 | A1 * | 7/2010 | Hansen et al. ................ 707/728 |
| 2010/0226627 | A1 * | 9/2010 | Barton et al. .................... 386/95 |
| 2010/0312596 | A1 * | 12/2010 | Saffari et al. ..................... 705/7 |
| 2011/0028128 | A1 * | 2/2011 | Cazanas et al. ........... 455/414.1 |
| 2011/0126241 | A1 * | 5/2011 | Beattie et al. .................. 725/62 |
| 2011/0179165 | A1 * | 7/2011 | Ravichandran ........ G06Q 10/06 709/224 |
| 2011/0264495 | A1 * | 10/2011 | Hailey .................. G06F 3/0482 705/14.16 |
| 2012/0124232 | A1 * | 5/2012 | Kim .............................. 709/231 |
| 2013/0104053 | A1 * | 4/2013 | Thornton et al. ............. 715/752 |
| 2013/0117365 | A1 * | 5/2013 | Padmanabhan et al. ..... 709/204 |
| 2013/0211971 | A1 * | 8/2013 | Lin et al. ..................... 705/27.1 |
| 2013/0304727 | A1 * | 11/2013 | Poon ............................ 707/722 |
| 2013/0326375 | A1 * | 12/2013 | Barak et al. .................. 715/758 |
| 2014/0009567 | A1 * | 1/2014 | Bjurel et al. ............... 348/14.13 |

* cited by examiner

*Primary Examiner* — Abdullahi E Salad
(74) *Attorney, Agent, or Firm* — Schwabe, Williamson & Wyatt

(57) ABSTRACT

In one example, an electronic device may be configured to receive over a network a user selection of media information that corresponds to a media streaming server, wherein the received user selection corresponds to a first account of the media streaming server. The electronic device may be configured to determine a second account that corresponds to an electronic messaging server in response to receiving the user selection. The second account may be different than the first account. The electronic device may be configured to cause a message including at least a portion of the media information to be electronically delivered to the electronic messaging server using the second account.

27 Claims, 5 Drawing Sheets

METHODS, DEVICES, AND MEDIUMS ASSOCIATED WITH MANIPULATING SOCIAL DATA FROM STREAMING SERVICES

TECHNICAL FIELD

The present disclosure is related generally to streaming services.

BACKGROUND

A known streaming service may stream a media object, e.g., a movie, a television program, or the like, to a subscriber on demand. In the known streaming service, a media streaming server may have access to a plurality of media objects. The media streaming server may be coupled to subscriber equipment, e.g., a set-top box, a desktop computer, a gaming console, a mobile device, or the like. The subscriber equipment may be configured to indicate available media objects, and may be configured to enable a subscriber to select one of the available media objects using a user interface of the subscriber equipment. The subscriber equipment may be configured to upload, over a network, a message to the media streaming server in response to receiving a selection from the user interface. The media streaming server may stream a corresponding one of the media objects to the subscriber equipment in response to receiving the message.

In the known streaming service, subscribers may make a selection to receive a stream of a corresponding media object, but may not share media information, e.g., content of a received media stream or metadata for the received media stream, with other subscribers or endpoints.

DETAILED DESCRIPTION

Figure 1:
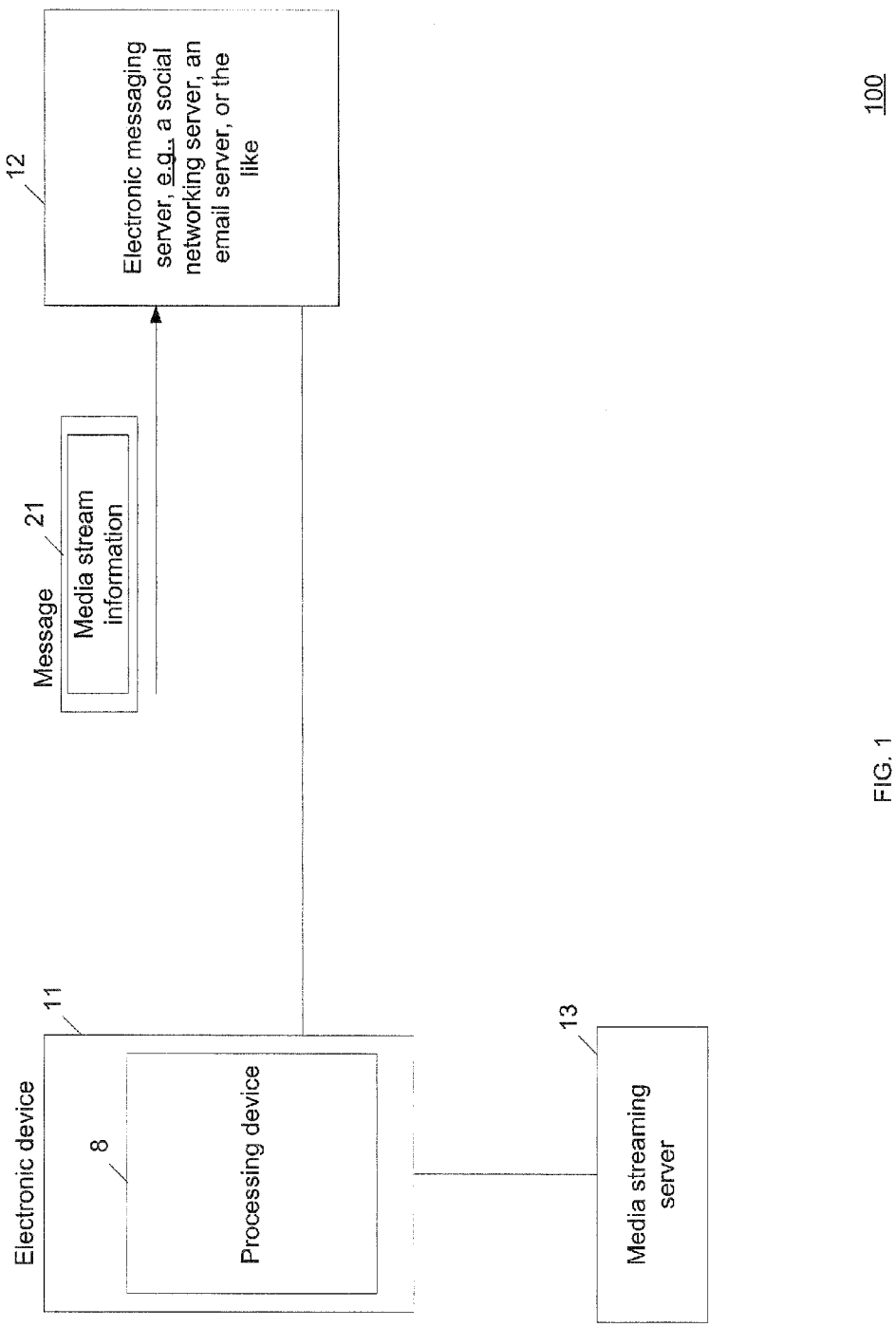
FIG. 1 depicts an example of a system for manipulating social data from streaming services.

FIG. 1 depicts an example of a system 100 for manipulating social data from streaming services. System 100 may include an electronic device 11 having a processing device 8. Electronic device 11 may be co-located with a media streaming server 13, or located remotely from media streaming server 13.

In an example, processing device 8 may be configured to receive over a network a user selection of media information that corresponds to media objects accessible to media streaming server 13. The user selection may correspond to a first account of media streaming server 13. Processing device 8 may be configured to determine a second account that corresponds to an electronic messaging server 12, e.g., a social networking server, an email server, or the like, in response to receiving the user selection. The second account may be different than the first account. Processing device 8 may be configured to cause a message 21 including at least a portion of the media information to be electronically delivered to electronic messaging server 12 using the second account.

In an example, processing device 8 may be configured to determine, according to the received user selection, whether to include instructions for electronic messaging server 12. Processing device 8 may be configured to generate a command in response to determining that the instructions are to be included. Processing device 8 may be configured to transmit the generated command to electronic messaging server 12.

Figure 2:
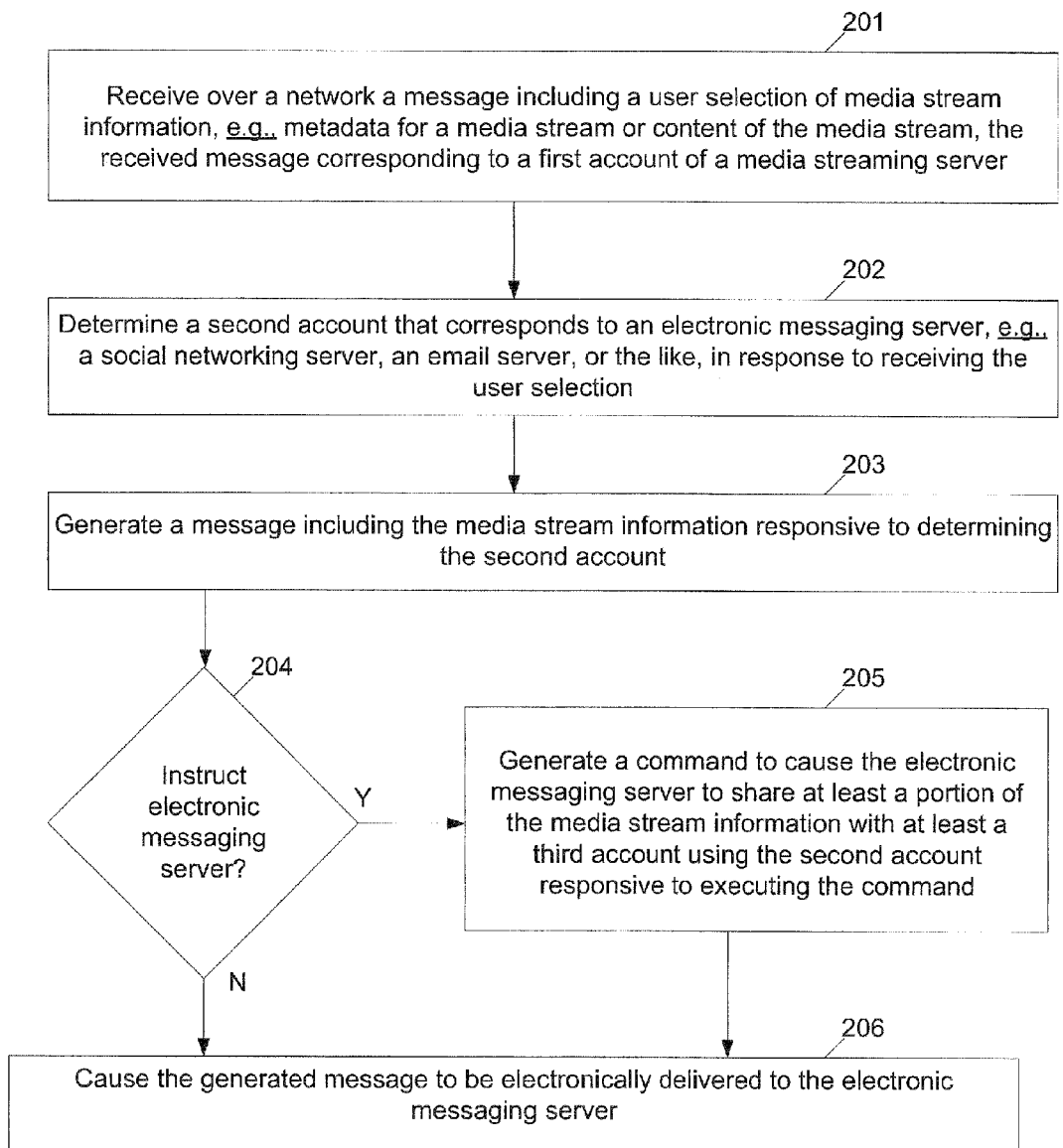
FIG. 2 depicts a flow chart of an example process for manipulating social data from streaming services.

FIG. 2 depicts a flow chart of an example process for manipulating social data from streaming services. In block 201, processing device 8 may receive over a network a message including a user selection of media stream information, e.g., metadata for a media stream or content of the media stream. The received message may correspond to a first account of a media streaming server.

In block 202, processing device 8 may determine a second account that corresponds to an electronic messaging server, e.g., a social networking server, an email server, or the like, in response to receiving the user selection. In block 203, processing device 8 may generate a message including the media stream information responsive to determining the second account.

In diamond 204, processing device 8 may determine whether to include instructions for the electronic messaging server. If processing device 8 determines to include instructions in diamond 204, then in block 205 processing device 8 may generate a command to cause the electronic messaging server to share at least a portion of the media stream information with at least a third account using the second account responsive to executing the command. If processing device 8 determines to not include instructions in diamond 204, then in block 206 processing device 8 may cause the generated message to be electronically delivered to the electronic messaging server.

The generated command may be configured to cause the electronic messaging server to share, using the second account, the portion of the media information with at least a third account. For example, the command may be configured to cause the electronic messaging server to post, using the second account, the portion of the media information to a profile associated with the third account; to post, using the second account, a status update that includes the portion of the media information; to send, using the second account, a message that includes the portion of the media information to the third account; to add a link to a website or social networking profile to a queue associated with the third account; or the like, or any combination thereof.

In an example, the generated command may be configured to cause the electronic messaging server to add an entry corresponding to the media information into a recommended media list associated with an account of the electronic messaging server, i.e. the second account or the third account. In an example, the generated command may be configured to the cause electronic messaging server to add a link to a web page, e.g., a link to a product or service web page, to a list associated with an account of the electronic messaging server, i.e. the second account or the third account.

Figure 3:
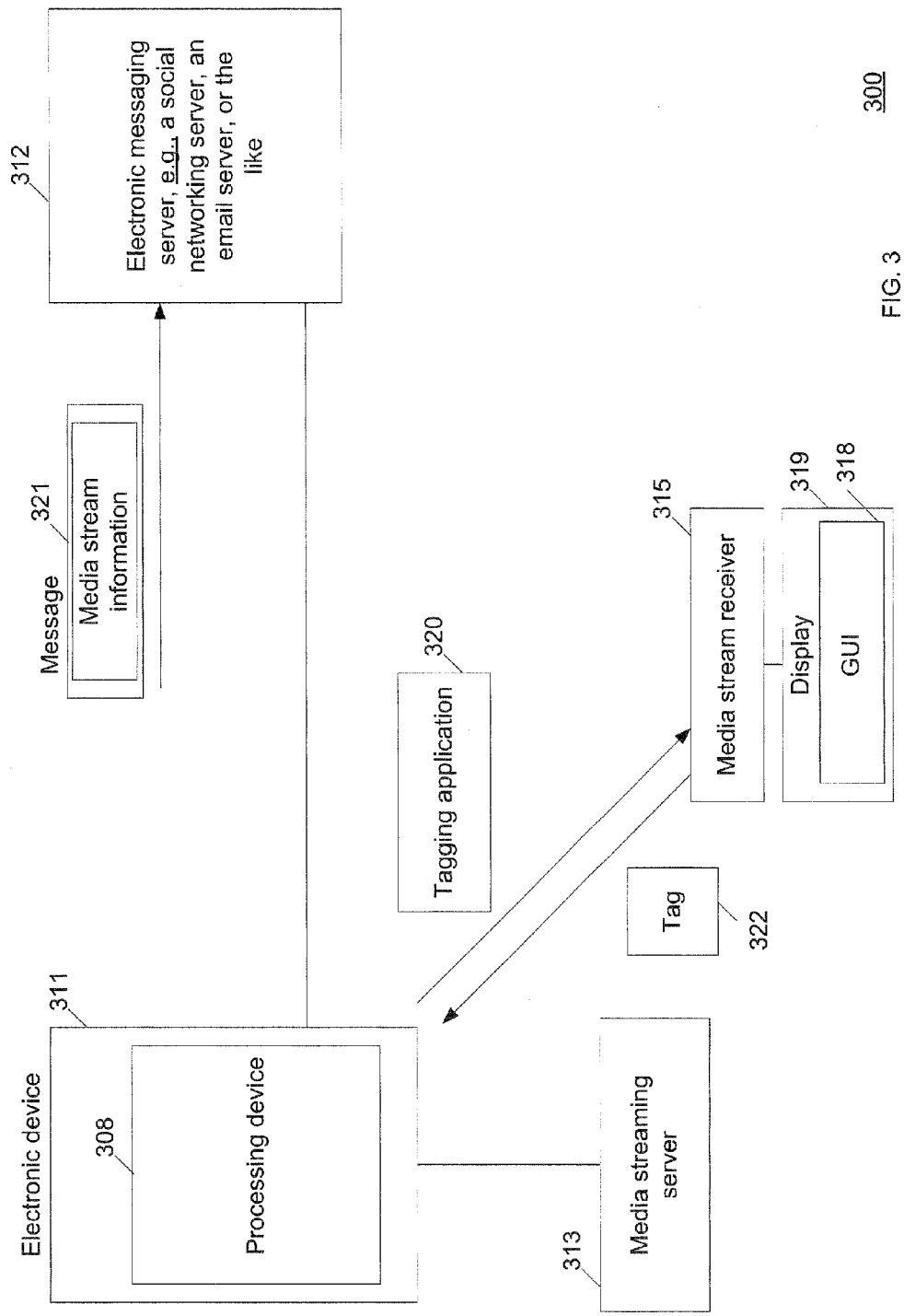
FIG. 3 depicts an example of a system for manipulating social data from streaming services using a tagging application.

FIG. 3 depicts an example of a system 300 for manipulating social data from streaming services using a tagging application. System 300 may include an electronic device 311 having a processing device 308. Electronic device 311 may be co-located with media streaming server 313, or located remotely from media streaming server 313.

In an example, processing device 308 may be configured to receive over a network a user selection of media information that corresponds to media objects accessible to media streaming server 313. The user selection may correspond to a first account of media streaming server 313. Processing device 308 may be configured to determine a second account that corresponds to electronic messaging server 312, e.g., a social networking server, an email server, or the like, in response to receiving the user selection. The second account may be different than the first account. Processing device 308 may be configured to cause a message 321 including at least a portion of the media information to be electronically delivered to electronic messaging server 312 using the second account.

Processing device 308 may be configured to download a tagging application 320 to a media stream receiver 315, e.g., subscriber equipment, associated with media streaming server 313. Tagging application 320 may be configured to enable tagging of a received media stream using a user interface of media stream receiver 315. For example, tagging application 320 may be configured to display a graphical user interface 318 on a display 319 coupled to media stream receiver 315 responsive to a processing device of media stream receiver 315 executing tagging application 320.

Graphical user interface 318 may include a control, e.g., a soft button, to tag media information associated with a media stream, e.g., a media stream displayed concurrently with graphical user interface 318. In an example, graphical user interface 318 may be configured to generate a tag corresponding to a currently displayed content of the media stream, e.g., a currently displayed image, in response to operation of the control. In an example, graphical user interface 318 may be configured to generate a tag corresponding to a character, a scene, or an object from a scene, or the like, or any combination thereof, of the media stream.

In an example, graphical user interface 318 may be configured to enable a user to input a caption for the tagged media information. Tagging application 320 may attach an input caption to the corresponding tag, e.g., insert the input caption into the corresponding tag, prepend the input caption to the corresponding tag, append the input caption to the corresponding tag, or the like. An attached caption may be referenced by a command generated by processing device 308 and utilized per the command by electronic messaging server 312 when sharing media information corresponding to tag 322.

Tagging application 320 may upload tag 322 to electronic device 311. Processing device 308 may analyze tag 322 to identify a portion of metadata or content of an available media object of a streaming service. For example, the identified portion may comprise a portion of content of an available media object, i.e. a portion of content of a video streamed to media stream receiver 315 by media streaming server 313, that corresponds to the tagged scene, character, or object. The identified portion may comprise a portion of metadata associated with the available media object. For example, the identified portion may comprise a link to a web page. In an example, the web page may correspond to a product or service purchase web page of the tagged object. Processing device 308 may insert the identified portion in message 321.

Figure 4:
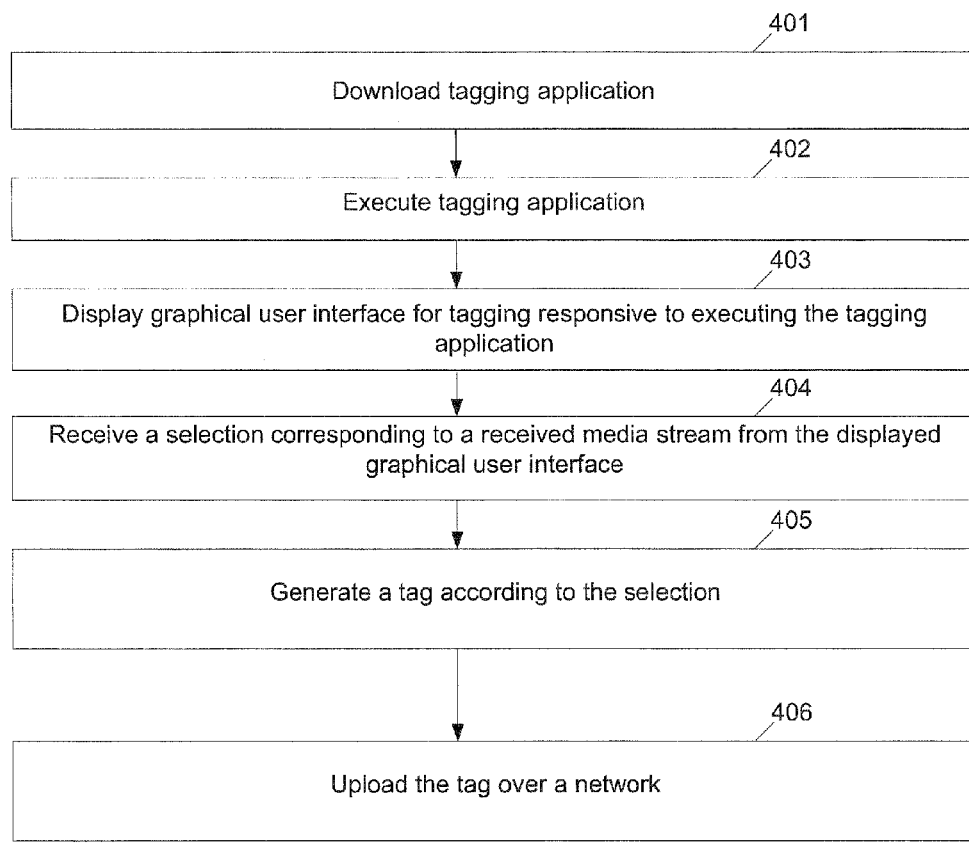
FIG. 4 depicts a flow chart of an example process for manipulating social data from streaming services using a tagging application.

FIG. 4 depicts a flow chart of an example process for manipulating social data from streaming services using a tagging application. In block 401, media stream receiver 315 may download a tagging application. In block 402, media stream receiver 315 may execute the tagging application. In block 403, media stream receiver 315 may display a graphical user interface for tagging responsive to executing the tagging application. In block 404, media stream receiver 315 may receive a selection corresponding to a received media stream from the displayed graphical user interface. In block 405, media stream receiver 315 may generate a tag according to the selection. In block 406, media stream receiver may upload the tag over a network.

Figure 5:
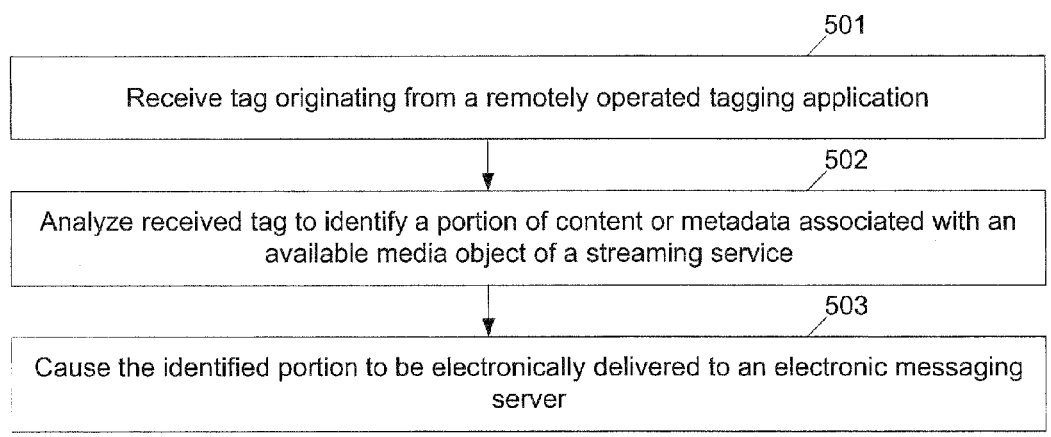
FIG. 5 depicts a flow chart of an example process for manipulating social data from streaming services using a tag uploaded from a tagging application.

FIG. 5 depicts a flow chart of an example process for manipulating social data from streaming services using a tag uploaded from a tagging application. In block 501, processing device 308 may receive a tag originating from a remote tagging application. In block 502, processing device 308 may analyze the tag to identify a portion of content or metadata associated with an available media object of a streaming service. In block 503, processing device 308 may cause the identified portion to be electronically delivered to an electronic messaging server. The identified portion may be electronically delivered by including the identified portion in a message generated according to the example process depicted in the FIG. 2.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of various examples, it should be apparent that the examples may be modified in arrangement and detail without departing from such principles. Claim is made to all modifications and variations coming within the spirit and scope of the following claims.

The invention claimed is:

1. A memory device having instructions stored thereon that, in response to execution by a processing device, cause the processing device to perform operations comprising:
   receiving over a network an upload from an application configured to enable tagging of a media stream of a media streaming server using a user interface of a media stream receiver of said application, the upload including information corresponding to a user selection of media information that corresponds to said media stream;
   wherein the received user selection includes information usable to determine more than one account each one of which corresponds to a different one of a plurality of different services, the plurality of different services including a first web service and a second service that is different than the first web service, wherein a first account of said more than one account corresponds to the media streaming server; and
   wherein the operations further include:
      causing a message including at least a portion of the media information to be electronically delivered to an electronic messaging server using a second different account of the more than one account;
      determining, according to the received user selection, whether to include instructions for the electronic messaging server;
      generating a command in response to determining that the instructions are to be included, wherein the command is configured to cause the electronic messaging server to share, using the second account, the portion of the media information with a third account of the same service, of the plurality of services, as the second account; and
      transmitting the command to the electronic messaging server.

2. The memory device of claim 1, wherein the electronic messaging server comprises a social networking server.

3. The memory device of claim 1, wherein the electronic messaging server comprises an email server, and wherein the second account comprises an email account.

4. The memory device of claim 1, wherein the command is configured to cause the electronic messaging server to post, using the second account, the portion of the media information to a profile associated with the third account.

5. The memory device of claim 1, wherein the command is configured to cause the electronic messaging server to post, using the second account, a status update that includes the portion of the media information.

6. The memory device of claim 1, wherein the command is configured to cause the electronic messaging server to send, using the second account, a message that includes the portion of the media information to the third account.

7. The memory device of claim 1, wherein the command is configured to cause the electronic messaging server to add a link to a website or social networking profile to a queue associated with the second account.

8. The memory device of claim 1, wherein the operations further comprise:
   downloading said application to the media stream receiver.

9. The memory device of claim 1, wherein the application is configured to enable tagging of an image in a video stream using the user interface.

10. The memory device of claim 1, wherein the application is configured to enable tagging of a scene, a character, or an object of a video stream using the user interface.

11. The memory device of claim 10, wherein the media information comprises a portion of content of the video stream corresponding to the tagged scene, character, or object.

12. The memory device of claim 1, wherein the media information comprises content of the media stream.

13. The memory device of claim 1, wherein the media information comprises meta data of the media stream.

14. An apparatus, comprising:
   means for receiving an upload from an application configured to enable tagging of a media stream of a media streaming server using a user interface of a media stream receiver of said application, the upload including information corresponding to a user selection of media information that corresponds to said media stream;
   wherein the received user selection includes information usable to determine more than one account each one of which corresponds to a different one of a plurality of different services, the plurality of different services including a first web service and a second service that is different than the first web service, wherein a first account of said more than one account corresponds to the media streaming server;
   means for causing a message including at least a portion of the media information to be electronically delivered to an electronic messaging server using a second different account of the more than one account;
   means for determining, according to the received user selection, whether to include instructions for the electronic messaging server; and
   means for generating a command to be transmitted to the electronic messaging server in response to determining that the instructions are to be included, wherein the command is configured to cause the electronic messaging server to share, using the second account, the portion of the media information with a third account of the same service, of the plurality of services, as the second account.

15. The apparatus of claim 14, further comprising means for downloading the application to the media stream receiver.

16. The apparatus of claim 14, wherein the application is configured to enable tagging of an image in a video stream using the user interface.

17. The apparatus of claim 14, wherein the application is configured to enable tagging of a scene, a character, or an object of a video stream using the user interface.

18. The apparatus of claim 17, wherein the media information comprises a portion of content of the video stream corresponding to the tagged scene, character, or object.

19. A method, comprising:
   receiving over a network an upload from an application configured to enable tagging of a media stream of a media streaming server using a user interface of a media stream receiver of said application, the upload including information corresponding to a user selection of media information that corresponds to said media stream;
   wherein the received user selection includes information usable to determine more than one account each one of which corresponds to a different one of a plurality of different services, the plurality of different services including a first web service and a second service that is different than the first web service, wherein a first account of said more than one account corresponds to the media streaming server;
   causing a message including at least a portion of the media information to be electronically delivered to an electronic messaging server using a second different account of the more than one account;
   determining, according to the received user selection, whether to include instructions for the electronic messaging server;
   generating a command in response to determining that the instructions are to be included, wherein the command is configured to cause the electronic messaging server to share, using the second account, the portion of the media information with a third account of the same service, of the plurality of services, as the second account; and
   transmitting the command to the electronic messaging server.

20. The method of claim 19, wherein the command is configured to cause the electronic messaging server to post, using the second account, the portion of the media information to a profile associated with the third account.

21. The method of claim 19, wherein the command is configured to cause the electronic messaging server to post, using the second account, a status update that includes the portion of the media information.

22. The method of claim 19, wherein the command is configured to cause the electronic messaging server to send, using the second account, a message that includes the portion of the media information to the third account.

23. The method of claim 19, wherein the command is configured to cause the electronic messaging server to add a link to a website or social networking profile to a queue associated with the second account.

24. The method of claim 19, further comprising downloading the application to the media stream receiver.

25. The method of claim 19, wherein the application is configured to enable tagging of an image in a video stream using the user interface.

26. The method of claim 19, wherein the application is configured to enable tagging of a scene, a character, or an object of a video stream using the user interface.

27. The method of claim 26, wherein the media information comprises a portion of content of the video stream corresponding to the tagged scene, character, or object.

\* \* \* \* \*